United States Patent [19]

Haslett

[11] 4,262,970

[45] Apr. 21, 1981

[54] SEAL ASSEMBLY

[75] Inventor: Glenn M. Haslett, Peoria, Ill.

[73] Assignee: Caterpillar Tractor Co., Peoria, Ill.

[21] Appl. No.: 134,620

[22] PCT Filed: Sep. 14, 1979

[86] PCT No.: PCT/US79/00724

§ 371 Date: Sep. 14, 1979

§ 102(e) Date: Sep. 14, 1979

[87] PCT Pub. No. WO81/00699

PCT Pub. Date: Mar. 19, 1981

[51] Int. Cl.³ .................. F16J 15/34; B62D 55/20
[52] U.S. Cl. .................... 305/11; 305/58 R;
                                    277/84; 277/188 R
[58] Field of Search ............ 277/84, 92, 95, 152,
                             277/153, 188 R; 305/11, 58 R

[56] References Cited

U.S. PATENT DOCUMENTS

| 2,641,381 | 6/1953 | Bertrand | 277/188 R X |
| 2,893,797 | 7/1959 | Breuneke | 277/188 R |
| 3,336,086 | 8/1967 | Reinsma | . |
| 3,390,922 | 7/1968 | Reinsma | . |
| 3,390,923 | 7/1968 | Reinsma | . |
| 4,179,130 | 12/1979 | Fass et al. | 277/84 |

Primary Examiner—David A. Scherbel
Attorney, Agent, or Firm—Wegner, Stellman, McCord, Wiles & Wood

[57] ABSTRACT

A seal assembly wherein a resilient seal (84) is disposed within an open annular recess (82) defined in a first member (56). A second member is disposed adjacent to and is deflectable toward and away from the recess (82) opening. Means (90) within the recess (82) and responsive to the spacing between the first (56) and second (74) members are effective to deflect the seal (84) of the first (56) and second (74) members over substantially the entire range of deflection of the members (56, 74).

15 Claims, 7 Drawing Figures

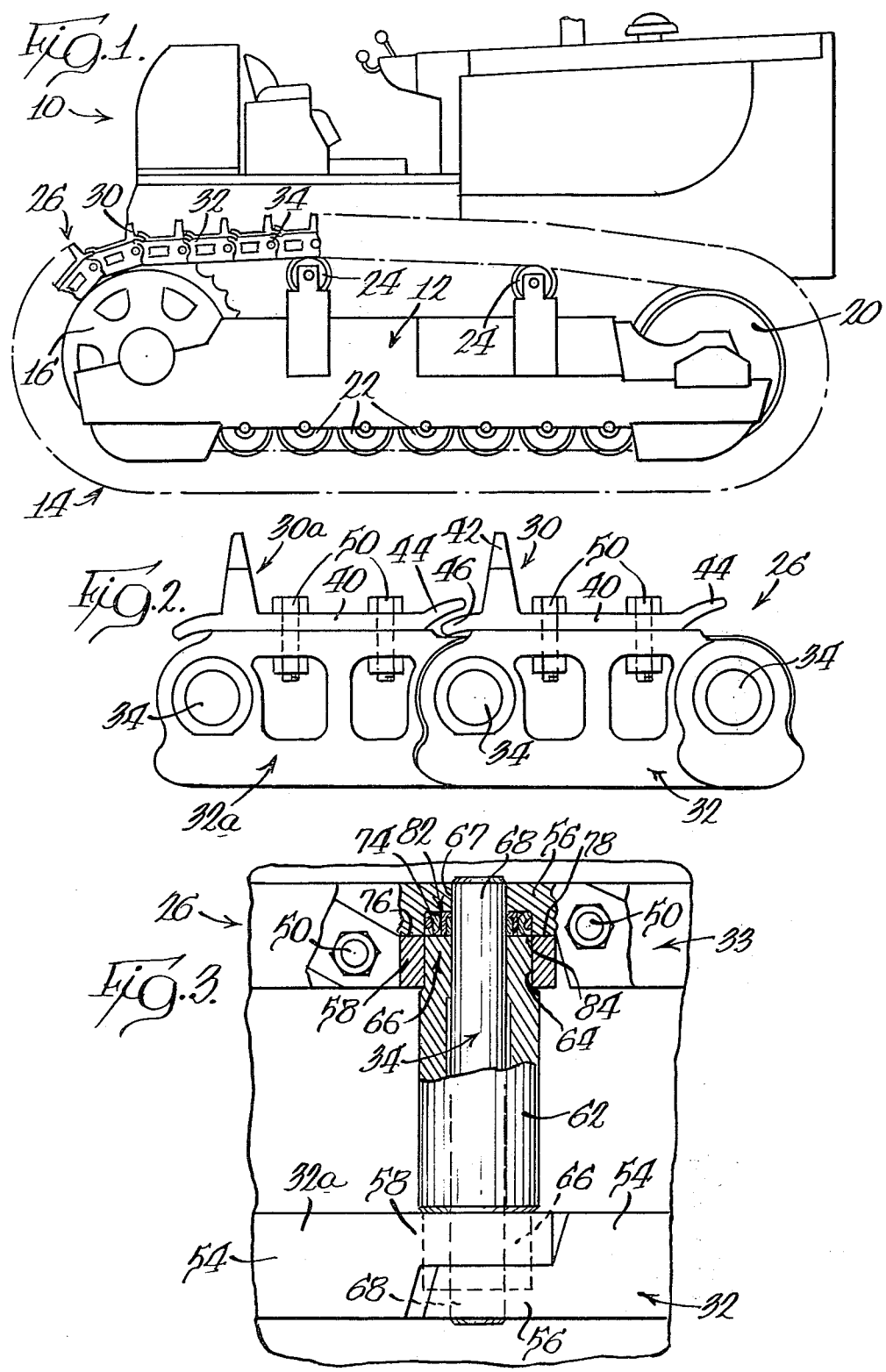

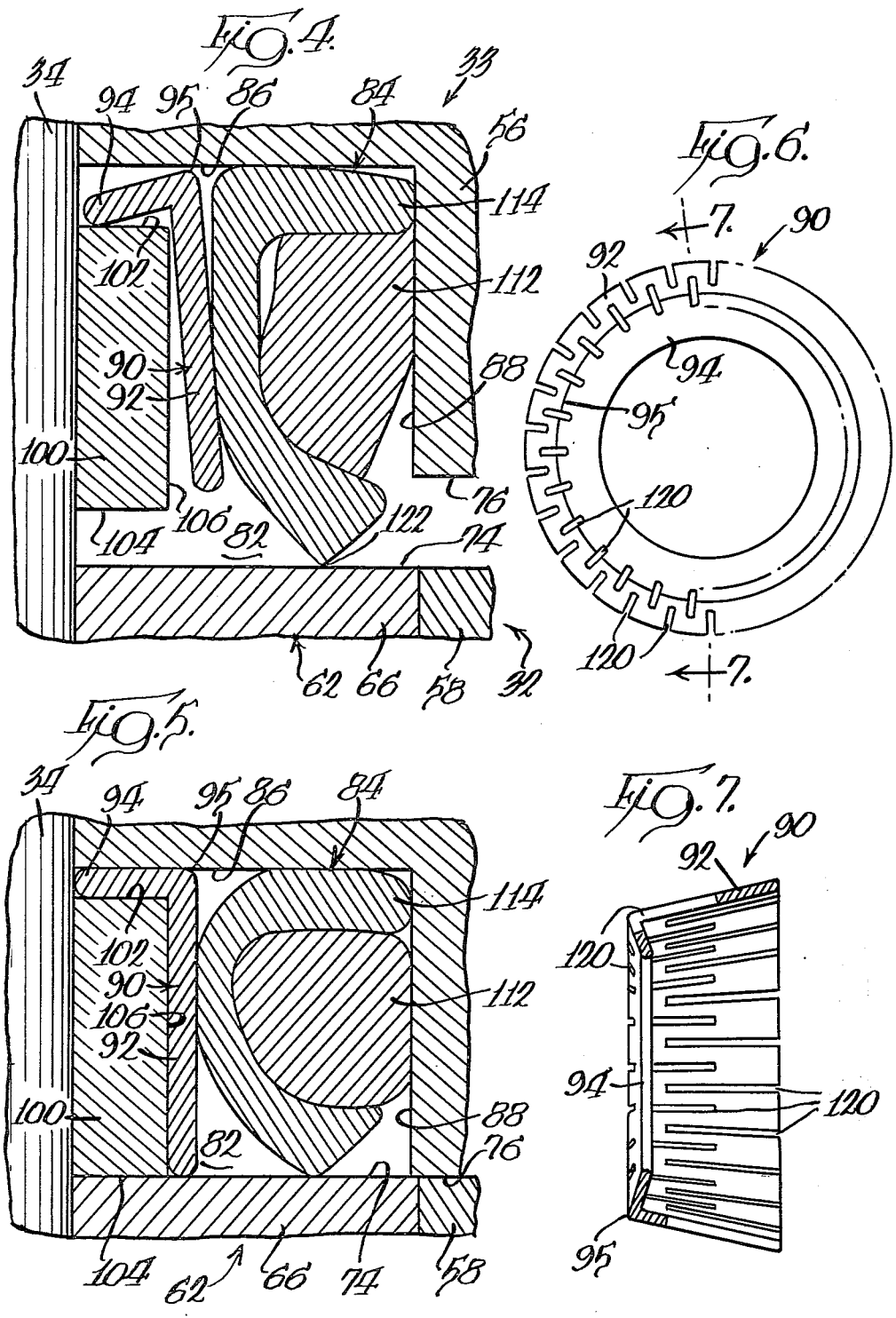

SEAL ASSEMBLY

DESCRIPTION

1. Technical Field

This invention relates to a seal assembly for maintaining a pressure seal between two deflectable components over a relatively wide range of deflection.

2. Background Art

The use of seals in structures such as track joints, loader linkages, undercarriage suspensions and the like is well known. Such structures are characterized by movable elements which are subject to relative displacement, such as the relatively movable track link and bushing in a track joint, for example. Seals are provided between such elements to retain lubricant between the elements during normal operation. Substantial seal compressibility is necessary to provide uninterrupted sealing contact between the seals and the elements notwithstanding a substantial amount of movement which may result from deflection, wear, endplay, or deformation of the components.

Previous seal arrangements have been effective over only a limited degree of deflection due to the inability of conventional compression seals to maintain a desired degree of compression and, therefore, sealing contact between components when relatively narrow ranges of delfection are exceeded.

Reinsma U.S. Pat. Nos. 3,336,086 (Aug. 15, 1967), 3,390,922 (July 2, 1968) and 3,390,923 (July 2, 1968) show track pin assemblies having seal assemblies exemplary of the type described above.

DISCLOSURE OF INVENTION

The present invention is directed to overcoming one or more of the problems as set forth above.

According to the present invention, improved sealing means for maintaining a pressure seal between first and second variably spaced walls comprise a resilient seal disposed between and sealingly engaged with the walls, and means responsive to an increase in the spacing between the walls to extend the seal in order to reduce the decrease in the sealing force of the seal against the walls resulting from the increase in spacing, to augment the resulting sealing force of the seal against the walls.

In a preferred embodiment, one element of a track pin assembly or other structure has an annular opening facing a second element of the structure. The second element is disposed outwardly of and adjacent to the recess and is movable toward and away from the recess. A resilient seal has a first portion retained in the recess in sealing engagement therewith, and a second portion in sealing engagement with the second member. Deflectable means responsive to an increase in spacing between the elements are provided to extend the second seal portion outwardly against the second element whereby the seal portions are maintained in sealing contact with their associated elements over a relatively wide range of element deflection.

BRIEF DESCRIPTION OF DRAWINGS

FIG. 1 is a side elevation of a track-type tractor employing an improved seal embodying the present invention;

FIG. 2 is an enlarged side elevtion of a pair of track linkages used in the tractor of FIG. 1;

FIG. 3 is a fragmentary top plan view of the track linkages of FIG. 2;

FIG. 4 is an enlarged section of a recess and seal employed in the track linkages of FIG. 3, with elements of the track linkages shown in a deflected position;

FIG. 5 is a section of the recess and seal of FIG. 4, with the track linkage elements in abutting relation and the seal shown in a state of full compression;

FIG. 6 is a top plan view of a movable recess wall element of FIGS. 4 and 5; and FIG. 7 is a section of the movable recess wall element of FIG. 6 taken along line 7—7.

BEST MODE FOR CARRYING OUT THE INVENTION

FIG. 1 illustrates a track-type tractor 10 employing an improved seal of the present invention. It is to be understood that the invention may be successfully employed in various machines or other structures having lubricated, sealed hinge points, such as loader linkages or undercarriage suspensions, and that tractor 10 of FIG. 1 is exemplary only.

Tractor 10 includes a frame 12 carried by a pair of endless tracks 14. (Only one track 14 is shown for simplicity.) The track 14 is driven by a sprocket 16 and travels about an idler 20. A plurality of track rollers 22 and carrier rollers 24 on the frame 12 support the track 14.

Track 14, a portion of which is shown schematically, comprises a plurality of track linkages 26, each having a track shoe 30 secured to a pair of upstanding track links 32 and 33 (not shown in FIG. 1) which are carried by a pair of spaced, transversely extending track pins 34.

FIGS. 2 and 3 show a pair of track linkages 26 in detail. A pair of track shoes 30 and 30a extend outwardly from the frame 12 (not shown in FIGS. 2 and 3) and each track shoe 30 and 30a includes a mounting plate 40, an upstanding gripping projection 42 extending from the plate 40, a forward lip 44 and an aft lip 46 integral with the plate 40. Each forward lip 44 extends upwardly and forwardly from its associated mounting plate 40, and each aft lip 46 extends downwardly and rearwardly from its associated mounting plate 40. The aft lip 46 of the forward track shoe 30 lies below the forward lip 44 of the following track shoe 30a.

Each mounting plate 40 is secured to each of a pair of transversely spaced track links 32 and 33, as by mounting botls 50. Each track link 32 and 33 is pivotally carried by a pair of longitudinally spaced, transversely extending track pins 34, as described below.

As seen in FIG. 3, each track link 32 and 33 has a relatively wide central body portion 54, a trailing outer projection 56 of less thickness than the body portion 54, and a leading inner portion 58, also of less thickness than the body portion 54. The trailing outer portion 56 of a leading link 32 mates with the leading inner portion 58 of a trailing link 32a to form a structure of a thickness substantially equal to that of the body portion 54.

Each pin 34 has an elongate bushing 62 positioned thereabout. Each link inner portion 58 has an aperture 64 of a diameter sufficient to capture an end 66 of the bushing 62, and each link outer portion 56 has an aperture 67 of a diameter sufficient to capture an end 68 of the pin 34. It is to be understood that the link portions 56 and 58 are press-fit upon the pin 34 and the bushing 62, respectively, and are rotatably pivotal thereabout.

Each bushing end 66 has a transverse end wall 74 which abuts a wall 76 on the link outer portion 56, which wall 76 also abuts an outer wall 78 of the link inner portion 58. An annular recess 82 is formed in the link outer portion 56 and a lubricated seal 84 is disposed therein, as described below.

It is to be emphasized that the sealed interface defined by the bushing end wall 74, link wall 76, and the seal 84 disposed therebetween in FIG. 3 is a preferred embodiment of the present invention, and no unnecessary limitations are to be inferred therefrom. Although the seal 84, shown to be disposed within an annular recess 82 in a track link 33, and means (to be described below) associated with the seal 84 to maintain the seal 84 in sealing contact with the wall 74 and the link 33 are shown as a movable side wall of the recess 82, it is to be understood that the scope of the invention broadly encompasses structures having variably spaced wall surfaces utilizing resilient seals with or without annular recessed seats, and may include seal urging means other than the movable recess side wall described below.

Referring now to FIGS. 4 and 5, the seal 84 is described in detail. The recess 82 in the link outer element 56 is defined by a fixed radial end wall 86, a fixed annular axial side wall 88 and by a movable annular axial side wall 90 disposed radially inwardly of the fixed side wall 88.

The movable side wall 90 comprises a frustoconical axial portion 92 having an integral generally radial lip 94 projecting inwardly from an edge 95 of the axial portion 92 at an angle other than 90°. (Although an acute angle is illustrated, the lip 94 may alternately extend from the edge 95 at an obtuse angle.) A thrust ring 100 is slidably disposed about the pin 34 and cooperates with the lip 94 to limit the travel of the bushing 62 toward the outer link element 56.

The thrust ring 100 includes axially inner and outer radial abutment surfaces 102 and 104, respectively. An outer axial cylindrical surface 106 extends between the surfaces 102 and 104.

The resilient seal 84 is disposed within the recess 82 and engages the fixed walls 86 and 88, the axial movable wall portion 92 and the bushing wall 74. The seal 84 of FIGS. 4 and 5 comprises a radially outwardly disposed load ring 112 and a radially inwardly disposed crescent-shaped element 114. It is to be understood that the structure of the seal 84 is not critical to the present invention, and no unnecessary limitations should be inferred therefrom.

The movable wall 90 is shown in detail in its unstressed state in FIGS. 6 and 7. The axial portion 92 is serrated and includes elongate axially extending apertures 120 which extend radially into the lip 94 to enhance compressibility.

INDUSTRIAL APPLICABILITY

During operation of the tractor 10, the link portions 56 and 58 may be momentarily deflected from the seal 84 and, more specifically, the crescent-shaped seal element 114 in sealing contact with the bushing wall 74 and the recess walls 86, 88 and 92.

Upon deflection of the bushing wall 74 from the recess 82, movement of the thrust ring 100 away from the end wall 86 allows the radial portion 94 of the movable wall 90 to bias the axial wall portion 92 generally radially outwardly to urge the relatively resilient seal elements 112 and 114 axially outwardly of the recess 82 to maintain sealing contact between the bushing wall 74, at a point 122, and the walls 86, 88 and 92. Axial displacement of the bushing wall 74 from the recess 82 thereby results in radial expansion of the movable wall 90 to reduce the volume of the seal cavity 82. If desired, the radial portion 94 of the movable wall 90 may be disposed between the bushing wall 74 and the thrust ring radial wall 104, but the pivotal biasing action of the movable wall 90 will be identical to that described above.

It should be noted that the preferred length of the axial movable wall portion 92 and the thickness of the lip 94 are chosen such that the combined axial length of the thrust ring 100 and the thickness of the lip 94 is approximately equal to the axial length of the fixed side wall 88 to allow abutment of the bushing wall 74 with the thrust ring outer radial wall 104 (or with the lip 94, depending upon which radial wall the lip 94 pivots) when the bushing 62 abuts the outer link 56.

It is apparent that the improved seal of the present invention provides effective sealing between deflectable elements of a track linkage or like structure over relatively wide ranges of deflection of the linkage elements and reduces loss of lubricant from the seal, thereby prolonging the effective life of linkage elements.

Other aspects, objects and advantages of this invention can be obtained from a study of the drawings, the disclosure and the appended claims.

What is claimed is:

1. In a structure having means (86, 74) defining first (86) and second (74) variably spaced wall surfaces, improved sealing means (84) for maintaining a pressure seal between said wall surfaces (86, 74) comprising:

a resilient seal (114) disposed between said wall surfaces (86, 74) and being deflected therebetween to have a first portion (114) sealingly engaged with said first wall surface (86) and a second portion (102) sealingly engaged with said second wall surface (74); and means (90) responsive to an increase in the spacing between said wall surfaces (86, 74) to extend said seal (114) to maintain said respective seal portions (114, 122) in sealing engagement with their associated wall surfaces (86, 74) whereby the decrease in the sealing force of said seal portions (114, 122) against said wall surfaces (86, 74) resulting from said spacing increase is reduced, said means responsive to said spacing increase comprising a compressible element (90) engaging and deflected between said seal (84) and at least one of said wall surfaces (86, 74).

2. The sealing means (84) of claim 1 wherein the reduction in said sealing force decrease is preselected to maintain said sealing force substantially constant over the range of variable spacing.

3. In a structure having means (86, 74) defining first (86) and second (74) variably spaced wall surfaces, improved sealing means (84) for maintaining a pressure seal between said wall surfaces (86, 74) comprising:

a resilient seal (114) disposed between said wall surfaces (86, 74) and being deflected therebetween to have a first portion (114) sealingly engaged with said first wall surface (86) and a second portion (102) sealingly engaged with said second wall surface (74); and means (90) responsive to an increase in the spacing between said wall surfaces (86, 74) to extend said seal (114) to maintain said respective seal portions (114, 122) in sealing engagement with their associated wall surfaces (86, 74) whereby the decrease in the sealing force of said seal portions (114, 122)

against said wall surfaces (86, 74) resulting from said spacing increase is reduced, said means (90) responsive to said spacing increase comprising a compressible element (90) having a first portion (94) engaging one said wall surface (86) and a second portion (92) engaging said seal (84), said compressible element (90) being extendable in response to an increase in spacing between said wall surfaces (86, 74) to yieldably urge said first and second seal portions (114, 122) into sealing engagement with said first (86) and second (74) wall surfaces, respectively.

4. A seal assembly (84) comprising:
(a) first (56) and second (74) variably spaced members, said first member (56) having an annular recess (82) opening toward said second member (74), said recess (82) having a wall (86) opposing said second member (74);
(b) a deflectable seal (84) having a first portion (114) retained in and in sealing engagement with said recess (82) and a second portion (122) in sealing engagement with said second member (74);
(c) deflectable means (90) responsive to an increase in the spacing between said first (56) and second (74) members to yieldably urge said first (114) and second (122) seal portions against said first (56) and second (74) members, respectively, to maintain said first (114) and second (122) portions in sealing engagement with said first (56) and second (74) members, respectively, over the range of variable spacing of said first (56) and second (74) members, said deflectable means (90) engaging one of said wall (86) and said second member (74).

5. The seal assembly (84) of claim 4 wherein said deflectable means (90) comprises spring means (90) compressible in response to a decrease in spacing between said members (56, 74) and extendable in response to an increase in spacing between said members (56, 74).

6. A seal assembly (84) comprising:
(a) first (56) and second (74) variably spaced members, said first emmber (56) having an annular recess (82) opening toward said second member (74);
(b) a deflectable seal (84) having a first portion (114) retained in and in sealing engagement with said recess (82) and a second portion (122) in sealig engagement with said second member (74); and,
(c) deflectable means (90) responsive to an increase in the spacing between said first (56) and second (74) members to yieldably urge said first (114) and second (122) seal portions against said first (56) and second (74) members, respectively, to maintain said first (114) and second (122) portions in sealing engagement with said first (86) and second (74) members, respectively, over the range of variable spacing of said first (56) and second (74) members, said deflectable means (90) comprising a movable side wall (92) of said recess (82) compressible in response to a decrease in spacing between said members (56, 74) and extendable in response to an increase in spacing between members (56, 74).

7. A track pin assembly (26) comprising:
(a) a track link (33) having a fixed radial inner end wall (86) and a fixed annular axial side wall (88);
(b) a radially movable, annular axial side wall (90) disposed radially inwardly of said fixed side wall (88) and cooperating with said fixed side (88) and end (86) walls to define an axially outwardly opening annular recess (82) in said track link (33);
(c) a bushing wall (74) disposed axially outwardly of said recess (82) adjacent said recess opening and movable axially toward and away from said recess (82);
(d) resilient seal means (84) having an inner portion (114) in said recess (82) engaging said side (88) and end (86) walls, and an outer portion (122) engaging said bushing wall (74), said seal means (84) urging said movable side wall (90) radially inwardly and said bushing wall (74) axially outwardly; and
(d) means (94) adjustably biasing said movable side wall (90) in a radial direction as a function of the spacing of said bushing wall (74) axially from said recess (82) to correspondingly vary the effective volume of the recess (82) and thereby effectively maintain said seal means (84) in sealing contact with said bushing wall (74) and said recess end wall (84).

8. The track pin assembly (26) of claim 7 wherein said outer portion (122) of said seal (84) extends resiliently axially outwardly of said recess (82) for engagement with said bushing wall (74) when said bushing wall (74) is spaced from said recess (82).

9. The track pin assembly (26) of claim 7 wherein said biasing means (94) comprises resilient means integral with and extending generally radially from said movable side wall (92) at an acute angle thereto for engagement with at least one of said fixed end wall (86) and said bushing wall (74).

10. The track pin assembly (26) of claim 7 wherein said biasing means (94) comprises resilient means integral with and extending generally radially from said movable side wall (92) at an oblique angle for engagement with at least one of said fixed end wall (86) and said bushing wall (74).

11. The track pin assembly (26) of claim 7 wherein said movable side wall (90) comprises a resilient element (90) engaging and exerting compressive force on said seal means (84) and on at least one of said fixed end wall (88) and said bushing wall (74).

12. The track pin assembly (26) of claim 11 wherein said resilient element (90) includes an elongate axial portion (92) for engagement with said seal means (84) and an integral portion (94) projecting from said axial protion (92) for engagement with one of said fixed end wall (86) and said bushing wall (74).

13. The track pin assembly of claim 12 wherein said resilient element (90) is generally frustoconical in shape.

14. The track pin assembly (26) of claim 13 further including means (100) for limiting the radially outward movement of said movable side wall (90), said limiting means (100) comprising a cylindrical element (100) disposed radially inwardly of said axial portion (92) of said resilient element (90).

15. The track pin assembly (26) of claim 7 further including means (100) for limiting the radially outward movement of said movable side wall (90).

* * * * *